June 2, 1925.
F. C. SMITH
STOP SIGNAL FOR MOTOR VEHICLES
Filed July 25, 1924
1,539,965
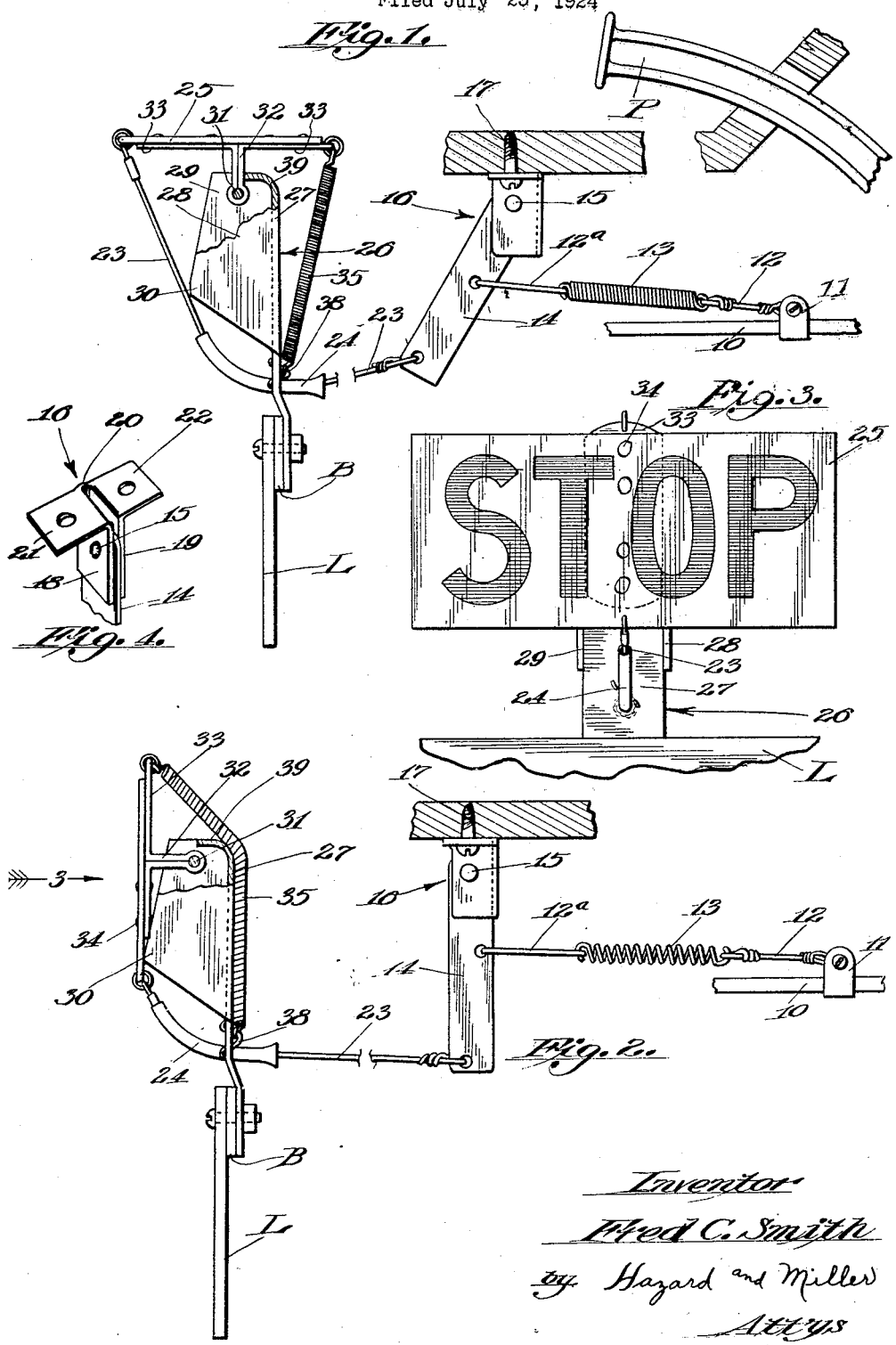
Inventor
Fred C. Smith
by Hazard and Miller
Attys Patented June 2, 1925.

1,539,965

UNITED STATES PATENT OFFICE.

FRED C. SMITH, OF LOS ANGELES, CALIFORNIA.

STOP SIGNAL FOR MOTOR VEHICLES.

Application filed July 25, 1924. Serial No. 728,169.

*To all whom it may concern:*

Be it known that I, FRED C. SMITH, a citizen of the United States, residing at Los Angeles, in the county of Los Angeles and State of California, have invented new and useful Improvements in Stop Signals for Motor Vehicles, of which the following is a specification.

This invention relates to signals and is especially adapted to provide a stop signal for automobiles or similar vehicles, which signal is adapted to be operated simultaneously with the operating of the brake.

An object of the invention is to provide a stop signal adapted to be mechanically operated by means of the brake.

A further object of the invention is to provide a mechanically operated stop signal which will be quickly thrown from a somewhat hidden position into a visible position by means of the brake structure and which will be provided with means for retracting the signal into the hidden position upon release of the brake.

With the foregoing and other objects in view which will be made manifest in the following detailed description and pointed out in the appended claims, reference is had to the accompanying drawing for an illustrative embodiment of the invention in its preferred form, wherein—

Fig. 1, is a diagrammatical view of the invention as applied to an automobile, the signal being shown in inoperative or hidden position.

Fig. 2, is a view similar to Fig. 1, the stop signal being shown in operative position.

Fig. 3, is a view of the stop signal as shown when looking in the direction of the arrow 3, of Fig. 2.

Fig. 4, is a perspective view of a detail of construction.

Referring to the accompanying drawings wherein similar reference characters designate similar parts, the brake rod 10 which is operated by means of the foot pedal P has a suitable bracket or collar 11 secured thereon and to which is attached a suitable length of cable 12. The cable 12 is connected to a spring 13 which is connected by means of another length of cable 12$^A$ to a lever 14 pivoted as at 15 to a suitable securing means generally designated by the reference character 16 which is secured by means of screws 17 to the bottom of the floor of the vehicle.

The securing means 16 is formed of a single piece of sheet metal bent to provide a pair of opposite sides 18 and 19 with the rivet extending therebetween and the lever 14 being pivoted upon the rivet 15 between the plates 18 and 19 as clearly shown in Fig. 4. Extensions 21 and 22 of the sides 18 and 19 are bent horizontally and have apertures therein to receive the screws 17. The portion 20 connecting the sides 18 and 19 provides a shoulder or abutment which limits the forward movement of the lever 14.

A cable 23, is connected to the lever 14, at a point more remote from the pivot 15, than the point of attachment of the cable 12$^A$. This cable 23, extends through a curved tubular guide 24, and is connected to the lower edge of the signal plate 25, upon the front face of which is printed or embossed the word "Stop," or its equivalent.

A support 26, for the signal plate 25, is provided which consists of a single piece of sheet metal bent to provide a back portion 27, and a pair of parallel spaced sides 28 and 29, which are so formed to provide shoulders 30, which limit the movement of the signal plate 25, upon its being turned into vertical position. A spindle 31, extends between the sides 28 and 29, and has a bracket 32, pivoted thereon which has oppositely disposed arms 33, to which the signal plate is secured by means of rivets 34. The back portion 27, of the support 26, has its lower extremity secured to any suitable supporting member upon the rear of the vehicle, herein shown as being secured upon the same bracket B, which carries the license plate L. A spring 35, is secured to uppermost bracket arm 33 and to a suitable clip 38, upon the back of the back portion 27. The upper end of the back portion 27, is bent as at 39, to limit the movement of the signal plate upon its being turned to horizontal position, as clearly shown in Fig. 1. This portion 39, also serves as a bearing upon which the spring 35, is bent so that the spring 35, is stretched most between the bent portion 39, and the bracket arm 33.

Upon the driver of a vehicle upon which the device is mounted, causing the car to stop by applying the brakes, it is seen that the brake rod 10, will be pulled slightly forward. This causes the lever 14, to be brought into vertical position as shown in Fig. 2, which by pulling the cable 23, swings the signal plate 25, about the spindle 31, into vertical position against the action of the spring 35. When the lever 14, is in abutting position against the abutment 20, of the securing means 16, the signal plate 25, will be abutting the shoulders 30.

If it is desired to apply the brake stronger, the pedal P, is pushed further forward causing the spring 13, to give as shown in Fig. 2, allowing the lever 14, to remain in vertical position. The lever 14, has the cables 12^A and 23 secured thereto preferably at the positions shown, so that a slight movement forward of the brake rod 10, will have such movement increased by the throw of the lever 14, which causes the signal plate to quickly snap into vertical position. Upon releasing the pedal P, the spring 13, first contacts and upon becoming contacted the spring 35, will pull the signal plate 25, into horizontal position causing the lever 14, to swing back into inclined position as shown in Fig. 1.

It is to be understood that various changes in the details of construction may be made without departing from the spirit or scope of the invention as defined by the appended claims.

What I claim is:

1. A stop signal for vehicles comprising a support formed of sheet metal bent to provide a back portion and a pair of sides, a spindle extending between said sides, a bracket rotatable upon said spindle, a signal plate secured to said bracket, spring means secured to said support and adapted to yieldably maintain said signal plate in horizontal position, and means for drawing said signal plate into a vertical position against the action of said spring means.

2. A stop signal for vehicles comprising a support formed of sheet metal bent to provide a back portion and a pair of sides, a spindle extending between said sides, a bracket bent around said spindle and rotatable thereon, a signal plate secured to said bracket, spring means secured to said support and bracket for yieldably maintaining said signal plate in horizontal position, and means for drawing said signal plate into a vertical position against the action of said spring means.

3. A stop signal for vehicles comprising a support formed of sheet metal bent to provide a back portion and a pair of sides, a spindle extending between said sides, a bracket bent around said spindle and rotatable thereon, a signal plate secured to said bracket, spring means secured to said support and bracket for yieldably maintaining said signal plate in horizontal position, and means for drawing said signal plate into a vertical position against the action of said spring means, said means being actuated upon the application of a foot brake.

4. A stop signal for vehicles comprising a support formed of sheet metal bent to provide a back portion and a pair of sides, a spindle extending between said sides, a bracket bent around said spindle and rotatable thereon, a signal plate secured to said bracket, spring means secured to said support and bracket for yieldably maintaining said signal plate in horizontal position, and means for drawing said signal plate into a vertical position against the action of said spring means, said back portion being bent forwardly and engageable by said bracket to prevent the movement of said signal plate past its horizontal position.

5. A stop signal for vehicles comprising a support formed of sheet metal bent to provide a back portion and a pair of sides, a spindle extending between said sides, a bracket bent around said spindle and rotatable thereon, a signal plate secured to said bracket, spring means secured to said support and bracket for yieldably maintaining said signal plate in horizontal position, means for drawing said signal plate into a vertical position against the action of said spring means, and means formed upon said sides for preventing movement of said signal plate past its vertical position.

In testimony whereof I have signed my name to this specification.

FRED C. SMITH.